March 1, 1966   N. G. TOMPKINS   3,238,086
COMPOSITE FOR PREPARING FLEXIBLE PRINTING PLATES
Filed May 21, 1962
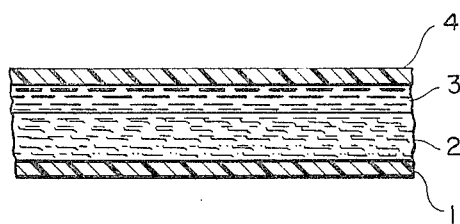

United States Patent Office 3,238,086
Patented Mar. 1, 1966

3,238,086
COMPOSITE FOR PREPARING FLEXIBLE PRINTING PLATES
Norman G. Tompkins, Melrose, Mass., assignor to W. R. Grace & Co., Cambridge, Mass., a corporation of Connecticut
Filed May 21, 1962, Ser. No. 196,348
7 Claims. (Cl. 161—184)

This invention relates to letterpress printing plates. In a specific aspect, it relates to flexible plates derived from a composite comprising a base sheet of a thin non-porous material, a porous flexible compressible material disposed on said base sheet, a liquid, heat-hardenable polymeric composition disposed onto and absorbed by the compressible material, and a second thin sheet of a non-porous material superposed on the polymeric composition.

Printing plate material in sheet form is very attractive to the printing industry because of the ease with which plates may be fabricated therefrom. In general, the sheet is cut from a supply stock to the desired size, the cut piece is assembled on top of a matrix, and the assembly is placed in a press for a prescribed dwell time. After the required residence time in the molding press has elapsed, the assembly is removed and cooled, the plate is separated from the matrix, and after trimming and grinding it is ready for mounting on the printing press.

Rubber plate gum is supplied to plate makers in the form of sheets of various thicknesses to correspond to different final plate gauges. Printing plates prepared from such material have gained extensive use in rotary press printing because of their flexible nature and the fact that they can be made rapidly and economically. Such plates, however, are not without criticism. On the one hand, the sheets are supplied in an uncured state which vulcanize during the molding operation. To avoid partial curing at room temperature, the rubber sheets must be kept under refrigeration. Any curing which may occur before the actual molding operation in the press will not produce a plate which assures fidelity of reproduction because the partially cured material will not readily fill the minute depressions of the mold. On the other hand, ordinary plate rubber is not a hard material and normally has a hardness value of about 50 to 60 (Shore A durometer). Consequently, the softness of the plates militates against their use where fineness of detail must be accurately reproduced, and they are normally considered unsatisfactory, for example, for reproducing halftone illustrations.

It is, therefore, an object of this invention to provide a printing plate material in sheet form which can be used to prepare plates as rapidly and economically as rubber plates but whose printing surface may be modified to various hardness values. This objective is achieved by providing a composite of materials sandwiched together which is comprised of a base sheet of a thin non-porous material, a sheet of porous flexible, compressible material disposed on the base sheet, a layer of a viscous liquid, heat-hardenable polymer composition disposed on and saturating the porous, compressible material and a second sheet of a non-porous material superposed on the liquid composition.

The composite is held intact principally by the slight adhesive effect of the liquid composition. The composition penetrates through the porous compressible material and in contact with the base sheet of non-porous material while the superposed thin sheet of non-porous material is in direct contact with the composition. Since the liquid composition forms the face of the printing plate when hardened by heat, the amount of composition used is such as to saturate the porous compressible material and provide a layer which is free of contact with the porous compressible material when the composite is press molded to avoid marring the printing surface. In preparing plates from these composites, the base and/or superposed thin sheets of non-porous materials may be stripped away from the composites before molding, or they may remain in place and thus be physically incorporated into the finished plate.

The drawing is a fragmentary cross-sectional view of the composite in which the numeral 1 represents a base thin sheet of non-porous material, 2 represents a sheet of porous, compressible material impregnated with the liquid composition 3, and 4 represents a superposed second thin sheet of non-porous material.

To prepare a printing plate from this material, a piece of the composite is cut crosswise and of a size to fit a particular matrix. The cut piece is then laid over the cavity side of the matrix and the assembly is placed in a molding press operating under suitable pressure and temperature conditions. During the molding operation, the porous compressible material integrates with the polymeric composition to form a permanent backing for the plate. In addition, if the superposed thin sheet has not been removed, it will integrate with the printing face of the plate and appear continuous therewith. Similarly, if the base thin sheet has not been removed, it will integrate with the plate backing. The plate may then be finished off in a conventional manner by trimming and grinding.

In general, the composite may be prepared by laying a long wide strip of a thin sheet of non-porous material on a smooth surface and then placing thereon a comparable size of a porous flexible compressible material, such as a non-woven fabric. A layer of a liquid, heat-hardenable polymeric composition is then leveled on the porous material and allowed to penetrate therethrough. The viscosity of the composition is such that it does not flow out the sides of the composite. A second thin sheet of non-porous material, which may be the same as the base sheet or a dissimilar type, is then placed on the surface of the liquid composition with care being exercised to avoid entrapment of air. This may be accomplished through use of a vacuum impregnating device. The composite may be put to immediate use by cutting a selected plate size or it may be rolled and passed to storage.

The thin sheet which is used on the top and bottom of the composite is a flexible sheet, preferably, of a thermosoftenable polymeric material. When the superposed sheet is to be integrated into the plate, it should be sufficiently thick to provide a desirable degree of surface hardness so as to effect a faithful transfer of halftone illustrations and, on the other hand, it must be excessively thick so as to appreciably decrease the overall flexibility of the plate. Ordinarily, sheet thickness for the printing surface may range from about .0005 to .010 inch, preferably .001 to .005, to achieve the desired results. The thickness of the sheet which may be integrated with the back of the plate bottom portion of the composite) is not critical. Its thickness, however, should not be such as to adversely affect the flexibility of the plate.

To be effectively integrated with the plate printing surface the superposed sheet must be one which is hard and flexible at room temperature and softens but does not liquefy at molding temperature. By "soften" is meant that the sheet is capable of being deformed in any direction by the application of heat without rupturing. A thermosoftenable sheet can thus be worked during the molding step so as to completely envelop the tops and sides of the relieved printable indicia as well as coating the planar surfaces of the plate. When removed from the heated press, the softened sheet resolidifies in its deformed state to provide a smooth uniform coating to the plate printing surface which appears continuous therewith. A sheet which liquifies at molding temperatures is undesirable because the liquid will tend to localize in certain areas, leaving other areas uncoated, and thus gives a plate having a non-uniform coating on its printing surface.

The selected sheet must be compatible, that is, it must be capable of firmly bonding with the body portion of the plate so as to withstand peeling during prolonged printing runs. An obvious criterion is that it must also be chemically resistant to inks and solvents normally used in printing.

Illustrative thermosoftenable films include polyvinyl chloride; vinyl chloride copolymerized with another polymerizable monomer, such as 3–15 percent vinyl acetate; polyamide resins (nylon); polyethylene terephthalate (Mylar); vinylidene chloride resins (Saran); vinylidene fluoride resins; chlorinated polyethylene; and polytrifluorochloroethylene (KEL–F). Homopolymers and copolymers of vinyl chloride are preferred because the body portion of the plate generally is prepared from liquid compositions of like materials and, therefore, excellent adhesion of the film and body portion is assured. A substantially unplasticized film is preferred because maximum surface hardness can be obtained, while films containing large amounts of plasticizer not only impair the surface hardness but the plasticizer may be subject to extractability by inks and solvents during the printing operation. Although some plasticizer may be incorporated in the film during its manufacture to assist the extruding process, the amounts so used are of such small order that no deleterious effects have been experienced when films containing between about 0.25 to 1.0 percent plasticizer were applied to printing plates of this invention.

The porous material which forms the backing of the plate should be one which is flexible and sufficiently compressible so that plate thickness can be varied over a wide range of values by using different thickness bearers in the press. These bearers are simply strips of metal which are disposed on opposite sides of the matrix and regulate the distance between the upper and lower platens when the molding press is closed. The material should have small pores or interstices so that flow of liquid is sufficiently impeded to permit development of pressure in the cavity during the molding operation. Ideally, impregnation should be preferentially in a direction normal to the surface of the plate rather than parallel thereto. In this way, the porous sheet material acts as a sort of continuous chase, i.e., it functions as a chase in limiting liquid flow parallel to the mold or plate surface without introducing the lack of versatility, inconvenience and cost associated with the use of a metal chase.

Various porous and compressible materials can be used to absorb the liquid composition during the molding step. Open cell neoprene sponge made in the manner well known in the rubber industry in which the cells communicate extensively with one another is particularly useful in making thick plates (sometimes referred to as "box dies") of the type used for printing on corrugated box board. The skin which normally covers the surface of such sponge must be removed by buffing, or a thick sheet may split leaving two thinner sheets even with an open surface to which satisfactory absorption and adhesion can be obtained. Open cell rubber latex foam sponge may be used in the same way but it does not contribute any additional strength to the assembly. Neither of these rubber materials gives any appreciable degree of shrink control when used alone. However, this deficiency can be overcome by interposing a shrink control element between the liquid composition and the porous rubber. Suitable elements include square weave glass fabric, various non-woven cotton materials, and rosin-sized cotton sheeting.

Glass mats of vaporous types made of glass fibers may be used where the maximum in plate flexibility is not required. Glass mats in which the fibers are oriented in random fashion give excellent shrink control which is uniform in all directions.

The most suitable material, and particularly for use in preparing very thin plates of the dry offset or wrap-around letterpress type, is a highly porous, felted, fibrous sheet. These sheets may be formed of any of the fibers commonly used to produce open, porous, felted webs, for example, natural fibers, such as wood or cotton, regenerated cellulose fibers, such as rayon, artificial fibers, such as nylon or acrylonitrile-vinyl chloride copolymer fiber, or any combination of fibers. A particularly effective sheet is one comprised of between about 70 to 100 percent mercerized cotton linters and 30 to 0 percent of short paper fibers. These sheets may be used as such or they may be impregnated with an elastomeric material, such as a vulcanizable natural rubber latex compound, partially cured, and used in the partially cured state. Complete curing will occur during the plate-molding operation.

Table I illustrates various porous and compressible materials which are useful in making practicable printing plates.

*Table I*

| Material No. | Type of Material | Apparent Density (g./cm.³) | Initial Thickness (inch) | Thickness when compressed to 10 lbs./in.² (inch) | Binder | Percentage Binder | Orientation Ratio | Type of Fiber |
|---|---|---|---|---|---|---|---|---|
| 1 | Open cell neoprene sponge | 7.2 | .125 | .106 | | | | |
| 2 | Open cell rubber latex foam sponge. | 2.05 | .250 | .085 | | | | |
| 3 | Webril R 2951 | 1.61 | .130 | .060 | | | 6–1 | Bleached cotton. |
| 4 | Webril R 2851 | 1.73 | .110 | .047 | | | 6–1 | Do. |
| 5 | Webril R 2651 | 1.77 | .090 | .038 | | | 6–1 | Do. |
| 6 | Fibrous web | (¹) | .028 | | Ureaform | 1–2 | | Mercerized cotton linters. |
| 7 | Fibrous web impregnated with an elastomer and partially cured. | 8.50 | .026 | | | | | |
| 8 | Pellon P15/500 | 1.14 | .300 | .100 | Ureaform | 50 | Random | Nylon 6. |
| 9 | Pellon P15/350 | .99 | .400 | .120 | do | 50 | do | Do. |
| 10 | Pellon P15/150 | 1.40 | .100 | .035 | do | 50 | do | Do. |
| 11 | Pellon A3/300 | .238 | 1.000 | .053 | None | | do | Cellulose acetate. |
| 12 | Pellon T3/200 | 3.27 | .110 | .063 | Acrylic Melamine | 50 | do | Polyamide. |
| 13 | Pellon N377G | 2.89 | .045 | .028 | None | | do | Do. |
| 14 | Pellon 5333 | 1.27 | .070 | .030 | Polyvinyl chloride | 20 | do | Cellulose acetate. |
| 15 | Pellon T5332B | 1.87 | .075 | .032 | do | 20 | do | Do. |
| 16 | Pellon T104 | 3.66 | .065 | .043 | Modified rubber latex. | | do | 60% nylon, 40% cottonized hemp. |
| 17 | Kraft | (²) | .018 | .017 | Melamineformaldehyde. | 0.2 | | 60% bleached kraft, 40% unbleached mercerized kraft. |

¹ 120 lbs./ream.
² 80 lbs./ream, where a ream consists of 500 24 x 36 inch sheets.

It is noted that the range of materials which may be used in carrying out this invention is very wide. The degree of compressibility is insignificant as shown particularly by materials 11 and 17. Material 11 was compressed 947 percent over its initial thickness while material 17 was compressed only 5.5 percent. The only criteria for selecting appropriate materials is that such materials be porous, have some compressibility, and have good compatibility with or adhesion to the plate material. Some strength is, of course, required to resist the tendency of the liquid composition to tear the material during the molding process.

The liquid, heat-hardenable polymeric compositions form the body portion of the plates which bear the reproducible printed matter on their faces. Suitable liquid compositions include plastisols which are comprised of polyvinyl chloride dispersed in a suitable plasticizer, and thermosetting compositions which are comprised of a polyvinyl chloride and an imidazoline curing agent. Although satisfactory plates can be produced from plastisols, they are thermoplastic and, therefore, the resulting plates must be cooled before they can be separated from the matrix. This cooling period delays the plate-making operation. Another objection is that the plasticizer is only physically mixed with the resin and may migrate to the plate printing surface and thus reduce its surface hardness. A further objection is that plates made from plastisols are subject to cold flow and distortion in subsequent handling, storing and mounting operations.

The preferred materials for forming the body portion are the liquid thermosettable compositions. Such materials readily penetrate all impressions in the matrix, and because of their infusible nature the resulting plates may be separated from the matrix while hot without causing distortion. Accordingly, the invention will be further described with respect to the use of the liquid thermosettable compositions comprising the vinyl chloride polymer and an imidazoline as the preferred materials in preparing the body portion of the plate, although it is to be understood that the plastisols provide satisfactory plates subject to the limitations indicated.

Imidazolines are strong organic bases, highly reactive with many reagents, and many possess strong surface activity. In these compositions, their principal function is to crosslink the polymeric chains. The preferred imidazolines for use in this invention are those which in themselves are non-volatile and chemically stable at curing temperatures. In addition, they should be such that the uncurred mixture with the halogen-containing polymer undergoes no change with time.

The imidazolines may be prepared by contacting appropriate amounts of polyamines and mono- and/or polycarboxylic acids at reactive temperatures and pressures for about 3 to 4 hours. The temperature may range between about 150° C. and 240° C. and the operable pressure may range between about .1 mm. and 760 mm. Hg. Suitable polyamines are ethylene and propylene diamine, diethylene and dipropylene triamine, triethylene tetramine, and tetraethylene pentamine. Suitable monocarboxylic acids are those containing from 1 to 18 carbon atoms, or even more, such as acetic, caproic, pelargonic, lauric, palmitic, oleic, and stearic acids; suitable polycarboxylic acids include those having from 3 to 36 carbon atoms, such as adipic, pimelic, suberic, azelaic, sebacic, and dimerized and mixtures of dimerized and trimerized fatty acids. In addition, mixtures of mono and/or polycarboxylic acids may be used. It is, of course, within the scope of this invention to use polyimidazolines, i.e., compounds having more than one imidazoline ring. These may be prepared by reacting mono- and polycarboxylic acids or mixtures thereof with a polyamine having more than two amino groups, such as triethylene tetramine, or mixtures of polyamines.

The following Table II illustrates reactants and reaction conditions which may be employed to prepare a representative number of imidazolines and polyimidazolines for use in forming the body portion of the plate. Various combinations of acid and amine may be employed and this table should be considered as representative and not exhaustive of the many possible combinations:

Table II

| Product | Acid | Moles | Amine | Moles | Reaction Conditions | | |
|---|---|---|---|---|---|---|---|
| | | | | | Pressure, mm. Hg | Temp., °C. | Hours |
| A | Sebacic / Oleic | 1 / 1 | Triethylene tetramine | 2 | 760–15 | 150–220 | 4 |
| B | Sebacic / Oleic | 5 / 2 | ----do---- | 6 | 760–15 | 150–200 | 4 |
| C | Sebacic / Oleic | 1 / 2 | ----do---- | 2 | 760–15 | 150–220 | 4 |
| D | Acetic | 1 | ----do---- | 1 | 760–15 | 150–200 | 4 |
| E | Pelargonic | 1 | Diethylene triamine | 1 | 760–50 | 150–200 | 4 |
| F | Empol 1022 [1] | 1 | ----do---- | 2 | 760–50 | 150–200 | 4 |
| G | Oleic / Sebacic / Empol 1024 [1] | 4 / 3 / 1 | Triethylene tetramine | 8 | 760–20 | 150–220 | 4 |

[1] Mixtures of polymerized acids comprising about 75 percent dimeric and 25 percent trimeric acids derived from mixture of unsaturated 18-carbon monocarboxylic fatty acids.

The imidazoline is first pre-reacted with an epoxy compound before it is mixed with the vinyl chloride polymer to provide the resulting printing plate with the desirable degree of flexibility. When the composition is cured during the molding step, the epoxy compound is chemically grafted to the vinyl chloride polymer through the imidazoline, thus rendering it inextractable by inks and solvents. Suitable epoxy compounds include epoxidized triglycerides of vegetable oil fatty acids, such as epoxidized soybean oil and epoxidized castor oil, and epoxidized esters of lower alkyl alcohols and unsaturated fatty acids. Representative compounds of the latter group include methyl-, ethyl-, propyl-, and butyl 9, 10-epoxystearate: butyl 9,10, 12,13-diepoxystearate, butyl 9,10-epoxypalmitate; and butyl 12-hydroxy-9,10-epoxystearate. Reaction of the imidazoline and the epoxy compound proceeds quite readily when carried out at temperatures between about 100° C. and 190° C., and preferably between about 130° C. and 150° C. The constitution of the imidazoline-epoxy compound reaction product may vary and is dependent upon the particular reactants used consistent with the degree of flexibility which is desired in the printing plate.

In making the liquid thermosettable composition, the vinyl chloride polymer is thoroughly dispersed in the pre-reacted imidazoline-epoxy compound fluid product. The mixture is stable at room temperature and the pre-reacted fluid reacts with the polymer only after heating. Thus, no polymerization or crosslinking takes place until the composition is heated in the press at about 120° C. to 200° C. for about 1 to 12 minutes and preferably at about 150° C. to 165° C. for 5 to 10 minutes. Upon heating to the softening point of the dispersed polymer, a reaction sets in which leads to chemical crosslinking of the polymer and chemical attachment of both imidazoline and epoxy molecules thereto. The result is a highly adhesive, non-thermoplastic polymer. Printing plates made from these compositions are flexible which permits their use on rotary or flat bed presses.

Preparation of a specific imidazoline-epoxy compound reaction fluid is illustrated in Example I:

EXAMPLE I 67.7 pounds (.24 mole) of oleic acid and 36 pounds (0.06 mole) of "Empol 1024" were mixed together in a glass vacuum vessel and then 36.4 pounds (.18 mole) of sebacic acid were added. The acids were heated to about 70° C. and then 70.2 pounds (.48 mole) of triethylamine tetramine were added. 0.21 pound of powdered sodium tripolyphosphate was then added to inactivate and chelate any metal impurities which may have ben present in the acids and amine. The reactants were vigorously agitated and a nitrogen atmosphere was applied and maintained throughout the reaction period. The mixture was heated initially at one atmosphere to about 150° C. and the temperature was gradually raised until a value of about 220° C. was reached over a three-hour period while the pressure was correspondingly reduced from 760 to 20 mm. Hg. Water of condensation was removed throughout the reaction period as formed. The amount of water removed corresponded with about 85 percent conversion of the carboxyls to imidazoline groups, leaving a balance of the carboxyls in the form of amides as confirmed by infrared absorption analysis. The product was then cooled to 130° C. and is identified as product "G" of Table II. Three hundred pounds of epoxidized soybean oil were heated to 130° C. in an open vessel and then 100 pounds of the foregoing imidazoline product (already at a temperature of 130° C.) were added slowly with stirring. When all of the imidazoline was added, the mixture was reacted at 130° C. for about one hour with gentle stirring and then cooled. The reaction proceeded smoothly and gave a product which was permanently fluid at room temperature. Care was taken to protect the reaction mixture and the cooled product from moist air and/or carbon dioxide, each of which tends to produce bubbles in the final print plate.

While the imidazoline is a highly effective curing agent for vinyl chloride polymers, its curing action must be controlled to avoid degradation of the polymer when the composition is heated in the press. To regulate the curing action of the imidazoline, a metallic compound, such as zinc oxide, is added to the composition. The zinc oxide retards blackening on heating, prevents gas evolution and augments resistance to moisture while retaining the advantage of imidazoline cure. The grade of zinc oxide is not a critical factor so long as good dispersion is obtained. A particle size of about .5 micron is quite effective.

An agent is also added to sequester any moisture which may remain in the composition after it is manufactured or which may reach the composition accidentally during storage and/or use. The presence of moisture is undesirable because it forms bubbles in the molded plate which adversely affect its printing surface. Any material which would form a compound with water at room temperature and which, when compounded with the water, would not decompose at about 175° C. would be a suitable moisture-sequestering agent provided it could be reduced to a finely divided state so as to obtain good dispersion and would not cause any undesirable side effects. Quicklime, Portland cement, and barium oxide have been satisfactorily used for this purpose. White Portland cement is preferred because it disperses readily to provide a more homogeneous plate.

The vinyl chloride polymer, imidazoline-epoxy compound reaction product, zinc oxide and the moisture-sequestering agent form a composition which is quite viscous and a satisfactory plate can be made using only these ingredients. However, its viscous nature makes handling and workability of the composition difficult. To alleviate these difficulties, a viscosity-lowering agent is included in the composition. Suitable agents include polyethylene glycol stearate, condensation products of ethylene oxide and propylene glycol, sorbitan monopalmitate, sorbitan monooleate, 3,5-dimethyl-1-hexyn-3-ol, and the fatty acid esters of polyethylene glycol 200–600 series (the designation numbers indicate the approximate molecular weight of the polymeric glycol minus the weight of the fatty acid moiety). Polyethylene glycol 400 monooleate is quite effective for this purpose.

The composition may be prepared by charging the requisite amounts of all ingredients in a single pass to a suitable mixing apparatus, or by adding the ingredients incrementally. Whatever method is selected, mixing is carried out until all ingredients are thoroughly and uniformly dispersed to form a homogeneous liquid. A preferred method of carrying out the mixing operation is to first form a masterbatch to assure intimate dispersion of all ingredients and then gradually add the remaining portions of the formulation to the masterbatch. A typical masterbatch comprises zinc oxide, the moisture-sequestering agent, and a portion of the imidazoline-epoxy compound reaction product, the total of which amounts to about 3 percent of the final weight of the composition. The ingredients may be processed in a suitable homogenizer, or a pebble mill when large batches are prepared. After a prescribed preliminary mixing period, the masterbatch is withdrawn and, to complete its mixing cycle, it is passed to a mixing kettle in which a low pressure of about 25 mm. Hg. or less can be reached and maintained. A representative masterbatch is illustrated in Example II:

EXAMPLE II

| Ingredient: | Pounds |
|---|---|
| Imidazoline-epoxy compound reaction product of Example I | 30 |
| Zinc oxide | 30 |
| White Portland cement | 50 |

A complete formulation of the composition which is suitable for use as the body portion of the improved plates of this invention is shown in Example III. When cured, this composition gives a plate having a hardness value of about 60, Shore A durometer.

EXAMPLE III

| Ingredient: | Pounds |
|---|---|
| Polyvinyl chloride, paste grade | 200 |
| Polyethylene glycol 400 monooleate | 5 |
| Imidazoline-epoxy compound reaction product of Example I | 275 |
| Masterbatch of Example II | 13 |

In preparing the composition of Example III, the entire amount of the imidazoline-epoxy compound reaction product is charged to a vacuum mixer and then the masterbatch is added with agitation. The components are mixed for a prescribed period, agitation is stopped, a portion of the polyvinyl chloride is then added, and the mixer is closed and a vacuum applied. Agitation is resumed and continued until the polyvinyl chloride is thoroughly incorporated in the liquid. Agitation is again halted, the vacuum is released, and the step of adding the polyvinyl chloride incrementally is continued until the entire amount required by the formulation has been charged and thoroughly blended. Agitation under vacuum is then resumed and continued until all specks and lumps have been completely dispersed. Finally, the viscosity-lowering agent is added and stirred in under vacuum. Upon completion of the last step, the resulting liquid composition is ready for immediate use in preparing the composite or it can be storred for subsequent use.

Example IV illustrates composition of a masterbatch for preparing plates having a hardness value of about 95, Shore A durometer.

EXAMPLE IV

| Ingredient: | Pounds |
|---|---|
| Imidazoline-epoxy compound reaction product of Example I | 50 |
| Zinc oxide | 15 |
| White Portland cement | 50 |

A complete formulation of the composition which is suitable for preparing the Shore A 95 plate is illustrated in Example V. It was prepared in substantially the same manner as described in Example III:

EXAMPLE V

| Ingredient: | Pounds |
|---|---|
| Polyvinyl chloride, paste grade | 1615 |
| Polyethylene glycol 400 monooleate | 75 |
| Imidazoline-epoxy compound reaction product of Example I | 1012 |
| Masterbatch of Example IV | 85 |

The proportions of the liquid thermosettable compositions may be varied depending upon the desired hardness of the final plate. For plates having a hardness of 60 to 95, Shore A, the compositions comprise 0.02 to 4.0, preferably 0.5 to 2.25, parts by weight of the imidazoline-epoxy compound reaction product, 0.005 to 1.0, preferably 0.015 to 0.03 part by weight of the moisture-sequestering agent and 0.02 to 1.0, preferably 0.075 to 0.05, part by weight of the viscosity-lowering agent. All proportions are based on one part by weight of polyvinyl chloride. Copolymers of vinyl chloride may be substituted for polyvinyl chloride, such as vinyl chloride copolymerized with up to 10 percent of another polymerizable monomer, e.g., 91 to 97 percent vinyl chloride—9 to 3 percent vinyl acetate, 93 to 95 percent vinyl chloride—7 to 5 percent dibutyl maleate. Typical effective plastisol compositions comprise polyvinyl chloride plasticized with a suitable plasticizer. These plastisols may be modified by the addition of suitable additives, such as stabilizers, fillers, etc.

The plates are molded in a standard platemaking press which is generally used in preparing matrices and rubber plastic plates. The equipment is essentially comprised of a hydraulic press which is capable of producing platen pressures of about 1000 pounds per square inch and in which the platens can be heated uniformly with steam or electricity to a temperature of at least about 145° C. In the molding operation, the pressure of the platens on the assembled matrix is regulated by bearers disposed on opposed sides of the matrix. These bearers consist simply of strips of metal, the thickness of which corresponds to the thickness of the assembled matrix. When the press is closed, the pressure of the platens is exerted principally on the bearers and the amount of pressure which is applied to the assembled matrix is governed by the corresponding thickness of the bearers. Accordingly, deformation of the matrix is avoided by the use of such bearers.

Preparation of composites of this invention and plates therefrom is illustrated in Examples VI to VIII.

EXAMPLE VI

A sheet of a polyvinyl chloride, .003 inch thick and containing 0.5 percent plasticizer, was laid on a smooth level surface and held in place by means of adhesive tape at the edges. (The sheet material was a commercial product known as Flex–O–Film Vinyl VR611.) A layer of the liquid composition of Example V was deposited on the polyvinyl chloride sheet by means of a Gardner gauge coated in amount which gave a uniform thickness of .125 inch. A strip of porous compressible bleached cotton (Webril R2951, material No. 3 of Table I) was disposed over the entire area of the liquid composition. This assembly was allowed to stand undisturbed, for a period of about 3 hours, and at the end of this time the liquid composition penetrated through the Webril R2951 material. A second sheet of VR611 film of equal size and shape as the first was then superposed on top of the liquid composition. It was carefully rolled onto the assembly under light pressure and in such manner that no kinks or creases were formed in the film and that no air pockets were trapped between the film and the remainder of the assembly. The composite was then pressed between flat platens in a cold press to a uniform thickness of about .125 inch. The composite was then suitable for use in molding.

Preparation of a printing plate from the composite of Example VI is illustrated in Example VII.

EXAMPLE VII

A rigid matrix, comprised of paperboard impregnated with a phenol-aldehyde synthetic resin, was prepared from an original type form in a conventional manner. The surface of the matrix cavity was sprayed with a thin layer of non-volatile release fluid containing a silicone oil to assist subsequent separation of the plate from the matrix. A stripe of the composite of Example VI was cut, trimmed and shaped with scissors to cover the area of the cavity, with ample margins. The composite strip was laid with the superposed thin sheet of non-porous material facing the cavity. The assembly was placed in a molding press in which the platens were heated to about 160° C. and the press was partially closed to within one inch of daylight. After residing in the partially-closed press for about 4 minutes, a Teflon-coated aluminum release sheet was placed on top of the assembly and the press was closed on thickness bearers. The height of the bearers was .252 inch which represented the sum of the floor height of the matrix, the desired plate thickness and the thickness of the release material. In closing the press, sufficient pressure was applied only to firmly contact the bearers and render them immovable between the platens. The temperature of the press was maintained at 160° C. and after a press residence time of 9 minutes, the assembly was withdrawn. The Teflon-coated aluminum sheet was removed from the assembly and the resulting plate was stripped from the matrix while hot without any damage to the plate or its printing surface. It was observed that the components of the composite were well integrated into a unitary plate. The top sheet of polyvinyl chloride adhered tenaciously to the plate printing surface and appeared continuous therewith. The letters and halftone dots were well formed. The thickness of the plate was uniform all over, being about .098 inch, ±.001 to .002 inch. It was finished to a uniform thickness of about .095 inch, ±.0005 inch, by grinding the backside on a Harley grinder. When proofed on a Vandercook press, the plate gave acceptable reproductions of the original material without significant shrinkage.

Example VIII illustrates another method for preparing the composite.

EXAMPLE VIII

An apparatus was constructed of sheet metal which consisted basically of an elongated funnel having a slit as an outlet measuring 6 inches by ⅛ inch. The apparatus was so supported that the slit was directed downwardly. The free ends of two rolls of .003 inch thick VR611 film and one roll of Webril R2951 interposed between the VR611 films were simultaneously fed into the top or wide end of the funnel. These materials emerged from the slit at the bottom of the funnel with a sheet of film on each side of the Webril material. A quantity of the liquid composition of Example V was then introduced into the top of the funnel and in the space between one film and the Webril R2961. The two films and the Webril R2951 were then slowly drawn through the funnel where, during the drawing process, the liquid composition coated and impregnated the Webril R2951 with each of the VR611 films being attached to the respective surfaces of the assembly. After drawing the "leader" portions of the films and Webril R2951, the composite emerged from the slit in a uniform thickness of about .125 inch. Plates were molded from such composites in the same manner as described in Example VII.

The thermosettable compositions are stable liquids having excellent castability and ability to print faithful reproductions. Because of their thermosetting character, the resulting plates may be stripped from the matrix while hot without causing plate distortion. The composites of this invention using such compositions produce plates which are flexible and, therefore, are convertible from rotary to flat bed press without distorting the printed image. By cutting the composite, plates of any size and shape may be prepared. Both the film and porous material are permanently integrated in the plate. The film which is permanently bonded to the printing surface enhances the printing quality of the plates, particularly in reproducing halftone illustrations.

I claim:

1. An assembled composite suitable for preparing flexible letterpress printing plates which comprises a base thin sheet of a non-porous material, a sheet of porous, flexible compressible material disposed on the base sheet, a liquid thermosetting polymeric composition disposed on and absorbed by the porous material, said composition being comprised of (1) a halogen-containing polymer, (2) a product derived by reacting an epoxidized ester and an imidazoline, (3) a moisture-sequestering agent and (4) zinc oxide, and a second thin sheet of a non-porous material superposed on the liquid composition.

2. A composite according to claim 1 wherein the base sheet and the superposed sheet are comprised of a thermosoftenable polymer.

3. A composite according to claim 2 wherein the halogen-containing polymer is polyvinyl chloride.

4. A composite according to claim 2 wherein each sheet of a thermosoftenable polymer is comprised of substantially unplasticized polyvinyl chloride.

5. An assembled composite suitable for preparing flexible letterpress printing plates which comprises a base thin sheet of substantially unplasticized polyvinyl chloride, a sheet of compressible, porous material disposed thereon, a thermosetting liquid composition disposed on and penetrating through the porous material in contact with the base sheet of polyvinyl chloride, and a second thin sheet of substantially unplasticized polyvinyl chloride superposed on and in contact with the liquid composition, said liquid composition being comprised of (1) polyvinyl chloride, (2) a product derived by reacting an epoxidized ester and an imidazoline, (3) a moisture-sequestering agent, and (4) zinc oxide.

6. A composite according to claim 5 wherein the epoxidized ester is a member selected from the group consisting of epoxidized triglycerides of vegetable oil fatty acids and epoxidized esters of lower alkyl alcohols and unsaturated fatty acids.

7. A composite according to claim 6 wherein the epoxidized ester is epoxidized soybean oil.

References Cited by the Examiner

UNITED STATES PATENTS

| 2,476,832 | 7/1949 | Donia. |
| 2,482,086 | 9/1949 | Foster. |
| 2,559,177 | 7/1951 | Terry et al. _____ 260—30.4 |
| 2,606,851 | 8/1952 | O'Mahony et al. ____ 161—42 XR |
| 2,878,234 | 5/1959 | Peterson _____ 260—309.6 XR |
| 2,949,394 | 8/1960 | Rodman _____ 161—189X |
| 3,133,825 | 5/1964 | Rubens _____ 117—62 |

OTHER REFERENCES

Greenspan et al.: Epoxy Plasticizers—Stabilizers, In Ind. Eng. Chem. vol. 50, pages 861 and 862, 1958.

JACOB H. STEINBERG, *Primary Examiner.*

EARL M. BERGERT, ALEXANDER WYMAN,
*Examiners.*